ial Patent [19] [11] 3,901,083
Wallace [45] Aug. 26, 1975

[54] LIQUID MANOMETER
[75] Inventor: Lindsay A. Wallace, Minneapolis, Minn.
[73] Assignee: Tescom Corporation, Minneapolis, Minn.
[22] Filed: Oct. 9, 1973
[21] Appl. No.: 404,382

[52] U.S. Cl. .................................................. 73/409
[51] Int. Cl.² ............................................. G01L 7/08
[58] Field of Search .............. 73/406, 409, 395, 410

[56] References Cited
UNITED STATES PATENTS
1,265,676  5/1918  Klump ................................... 73/406
1,626,294  4/1927  McPherson ........................... 73/409

Primary Examiner—Donald O. Woodiel
Attorney, Agent, or Firm—Dugger, Johnson & Westman

[57] ABSTRACT
A liquid manometer or pressure indicator having a housing with spaced indicia thereon, a sensing gland joined to the housing and having a chamber for liquid opening to the housing bore, a metal disk secured to a gland end surface that is remote from the housing and a rod extending within said chamber and bore, said housing having a vent aperture opening to said bore opposite said chamber and a porous plug in the vent opening and said gland having a coil spring therein to aid in resiliently retaining the shape of the gland.

3 Claims, 2 Drawing Figures flange 46c that is joined to the opposite annular edge of portion 46a whereby there is provided a liquid chamber 47. The outer diameter of the annular flange is such that the outer flange wall forms a close fit with the circumferential wall of bore portion 44, while the inner diameter of the flange is substantially larger than the adjacent part of bore portion 45. The annular flange 46c is of an axial length to have the terminal annular edge thereof abut against the shoulder of the housing at the juncture of bore portions 44 and 45, and the annular shoulder of the gland at the juncture of flange 46c and tubular portion 46a abut against the terminal annular edge of the housing threaded end portion. The adjacent surfaces of the gland and housing are bonded to one another in a hermetically sealed relationship.

A rigid disk 48 of metal or plastic that is of a diameter greater than that of bore 44, and desirably of the same diameter as that of portions 46a, 46b, is bonded to the surface of end wall 46b that is remote from the tubular portion 46a. The minimum diameter of the threads of the threaded portion 41b is greater than the outer diameter of tubular portion 46a and the diameter of disk 48.

An elongated element 49, for example a rod or a piece of wire, of a substantially smaller diameter than bore portion 45 is provided in bore portion 45 and chamber 47. The length of element 49 is nearly as great as the combined axial lengths of bore portion 45 and chamber 47.

As a result of providing the rod, any bubbles formed in bore portion 45 as liquid is forced into said bore portion are dissipated; i.e. the liquid travels down the rod due to capillary attraction, thus displacing the bubbles. As a result, in using the manometer there can be no stationary bubble in bore portion 45 that separates the liquid in said bore portion into two columns.

The chamber 47 is filled with a suitable liquid 54. If the liquid is colorless, than preferably a suitable dye is added to the liquid.

In order to aid in resiliently retaining the gland in its originally formed shape at a given pressure, a coil spring 50 at one end abuts against end wall 46b and at the opposite end against the shoulder formed by the juncture of bore 45 and bore 44. The outer peripheral surfaces of the coils of spring abut against the adjacent inner wall of the gland forming the chamber 47.

The manometer of this invention may be mounted by a mounting member or fitting 60 that has a passageway 61 that opens to and is in fluid communication with the fluid under pressure that is to have its pressure sensed. Passageway 61 has a threaded portion 61a with threads that form a matching fit with the housing threads and a bore portion 61b of a substantially greater diameter than end walls 16b, 46b and tubular portions 16a, 46a.

In using the manometer of the first embodiment of this invention (or second embodiment), the housing is threaded into a suitable mounting member, for example, a fitting so that the resilient gland tubular portion is surrounded by the media that is to have its pressure sensed. The mounting member is positioned such that the bore portion 15 (or 45) is inclined upwardly (or extends vertically) to extend to a higher elevation than chamber 17 (or 47).

When the manometer is in a vertical upright position with chamber 17 (47) below bore portion 15 (45) and the gland in an environment at atmospheric pressure, the level of liquid in bore portion 15 (45) is closely adjacent the lowermost indicia on the housing. Upon exposing the resilient gland to a higher pressure, the volume of chamber 17 (47) is decreased whereby the liquid raises to a higher level in bore portion 15 (45).

In order to minimize errors arising from gases permeating the resilient gland and the gland permanently deforming, it is preferred that a resilient material such as butyl rubber (for example, isobutylene isoprene) be used. Such a rubber has a low gas permeability, for example about $0.25 \times 10^{-8} cm^2/sec./atm.$, and a relatively low elasticity for resilient materials to minimize creeping of the gland in and around the coil spring, and the gland permanently deforming. Additionally, the coil spring aids in resisting the gland deforming and returning the gland to a nondeformed condition. To be mentioned is that the coil spring may be embedded in the tubular portion of the gland.

The porous plugs in addition to permitting venting of gases from the housing bores, also serve to prevent foreign material from getting into the housing bore.

During shipping and storage a sealing tape is provided over the porous plug to prevent leakage of fluid therethrough, particularly if the plug is permeable to the liquid 24 (54). In use the tape is removed and the central axis of elongation of the housing bore is inclined upwardly at an angle of at least 15°.

The manometer of the first embodiment is particularly adapted for measuring low pressure, for example 20 to 50 or 60 lbs. pressure such as is common in the water industry. This manometer is not substantially effected by chemical buildup on the gland walls that are exposed to the water as variations in pressure results in the gland walls flexing and being self cleaning. This is in contrast to conventional Bourdon tubes that calcium deposits on and the calcium deposits build up on.

The manometer of the second embodiment is especially adapted for measuring relatively high pressures, the disk providing a safety feature such as referred to in the above mentioned copending application.

The apparatus of this invention may also be used in manners more fully set forth relative the manometers set forth in said copending application.

What is claimed is:

1. A pressure indicator comprising an elongated, transparent housing from a first end portion, a second end portion and an axially elongated bore extending through the housing and having a first end portion and a second end portion opening through said housing first end portion and second end portion respectively, said bore first end portion having a first bore part and a second bore part opening to the first bore part axially remote from the bore second end portion, said second bore part being of a substantially smaller diameter than the bore first bore part to provide an annular shoulder, a pressure sensing resilient gland having a liquid chamber, said gland being hermetically secured to the housing first end portion to have said chamber in liquid communication with the first end portion of said bore, and having an end wall on the opposite side of the chamber from said bore, a tubular portion extending axially between said end wall and the housing and into abutting relationship with said shoulder, and an inner peripheral wall that in part defines said chamber, said tubular portion being generally frusto-conical and having a major base end abutting against said shoulder and a minor base end of a substantially smaller diameter than the diameter of the first bore part, an indicating

LIQUID MANOMETER

RELATED APPLICATIONS

This application discloses improvements in U.S. Patent Application, Ser. No. 300,786, Filed Oct. 25, 1972.

BACKGROUND OF THE INVENTION

A liquid manometer. Prior art pressure gauges that are used to give an indication of the pressure of a fluid in a container for example, those having a pointer that through a spring moved between various angular positions depending on the pressure being measured are relatively expensive to make. In prior art pressure indicators having a resilient diaphragm exposed to the fluid, the pressure of which is to be sensed, and a liquid in a bore for indicating the pressure sensed, there is encountered the problems that the shape of the diaphragm under given pressure conditions may change; that gas in the bore may be absorbed by the indicating liquid, which would require recalibration of the scale after a lapse of time; and that the housing having the bore cannot be accurately calibrated prior to the complete assembly of parts. In order to overcome problems such as the above, as well as others, this invention has been made.

SUMMARY OF THE INVENTION

A liquid manometer having a housing with an elongated bore, a resilient pressure sensing and liquid storage element secured to the housing, the housing having a bore and a vent aperture opening to said bore opposite said element, and a porous plug for said vent aperture. Preferably a coil spring is provided in said element to aid in returning said element to a given liquid capacity at datum pressure conditions.

BRIEF DESCRIPTION OF THE DRAWINGS

Referring to FIG. 1 of the drawings, the liquid manometer or pressure indicator, generally designated 10, of the first embodiment of this invention includes an elongated, rigid, transparent housing 11. The housing has a polysided nut end portion 11a; an opposite, externally threaded end portion 11b; and an intermediate portion 11c that is provided with axially spaced indicia 12. In the threaded end portion 11b there is provided a bore having a cylindrical bore 14. The housing also is provided with an axially elongated, tapered bore 15 that at one end opens the ambient atmosphere through the terminal end surface 20 of portion 11a and at the opposite end to the bore 14 in concentric relationship thereto. Bore 15 is of a substantially smaller diameter at said terminal end surface 20 than at its opening to bore 14, but of a substantially smaller diameter than bore 14. Thus bores 14, 15 at their intersection provide an annular shoulder 21.

Figure 1:
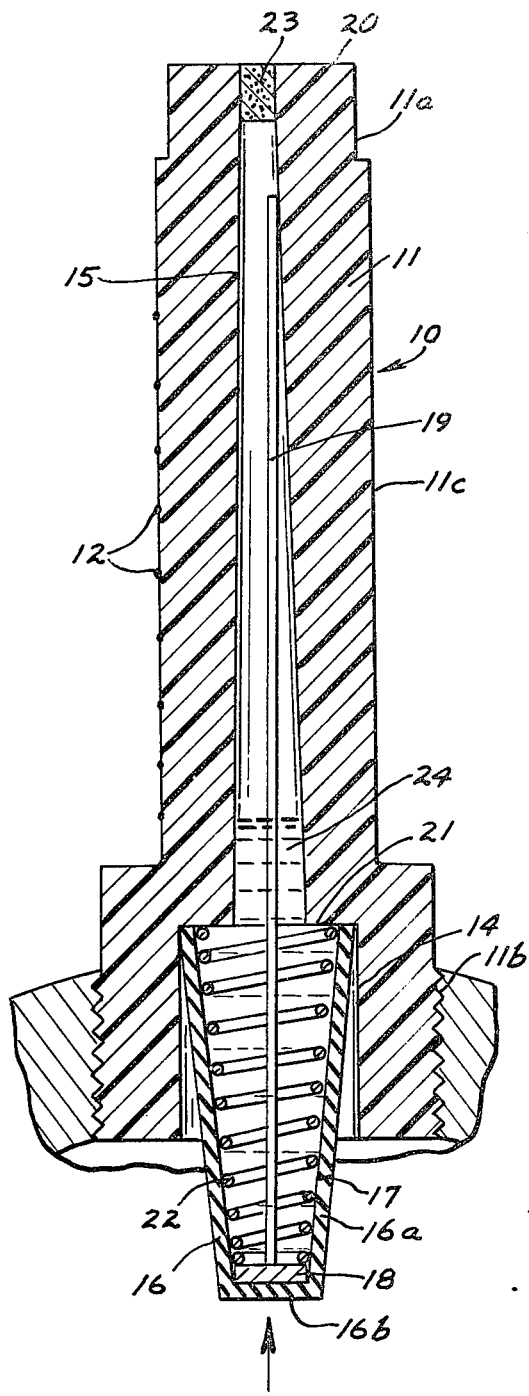
FIG. 1 is a longitudinal cross sectional view of a liquid manometer of the first embodiment of this invention.

A resilient gland (pressure sensing element) 16, for example made of rubber, has a somewhat frustoconical tubular portion 16a, and an end wall 16b joined to one annular edge of tubular portion 16a, the axially opposite annular edge part of the tubular portion abutting against shoulder 21 and the adjacent part of the wall defining bore 14 whereby there is provided a liquid chamber 17 opening to bore 15. The abutting surfaces of the housing and the gland are bonded to one another in a hermetically sealed relationship. The axial length of tubular portion is substantially greater than the axial length of bore 14, while the outer diameter of the minor base end (end joined to end wall 16b) of tubular portion 16a is substantially less than the diameter of bore 14. Thus there is a circumferential space radially between an axial length of the wall defining bore 14 and the tubular portion, the end wall 16b being located axially remote from shoulder 21. A rigid disk 18 of metal or plastic that is of a diameter greater than that of bore 15 at its opening to bore 14, and when the gland is at atmospheric pressure, is of substantially the same diameter as the adjacent part of the end wall, is bonded to the end wall to be located within the confines of the tubular portion.

In order to aid in retaining the gland so that it will be of substantially the same size and shape at the same pressure conditions, even after prolonged use, a coil spring 22 is provided in the gland to have one end abut against the disk 18 and the opposite end against shoulder 21. The diameter of the coils of spring is such to have the radial outer peripheral surfaces of the coils abut against the inner wall of the tubular portion when the gland is in a relaxed condition.

In the end portion of bore 15 that is opposite bore 14, there is provided a porous plug 23 that may be of sintered metal, ceramic or fiber material, or etc. Desirably the plug is permeable to gases such as air but not the indicating liquid 24 that is provided in the chamber 17. The porous plug permits venting of gases from the bore 15 above the liquid 24, rather than permitting gases being absorbed by the liquid which results due to the gases being pressurized when the liquid level in the bore raises and the end of the bore adjacent end 20 of the housing is sealingly closed. Advantageously the liquid is a silicone oil. An elongated element 19, for example a rod or piece of wire, of a substantially smaller diameter than bore 15 is provided in bore 15 and chamber 17.

Figure 2:
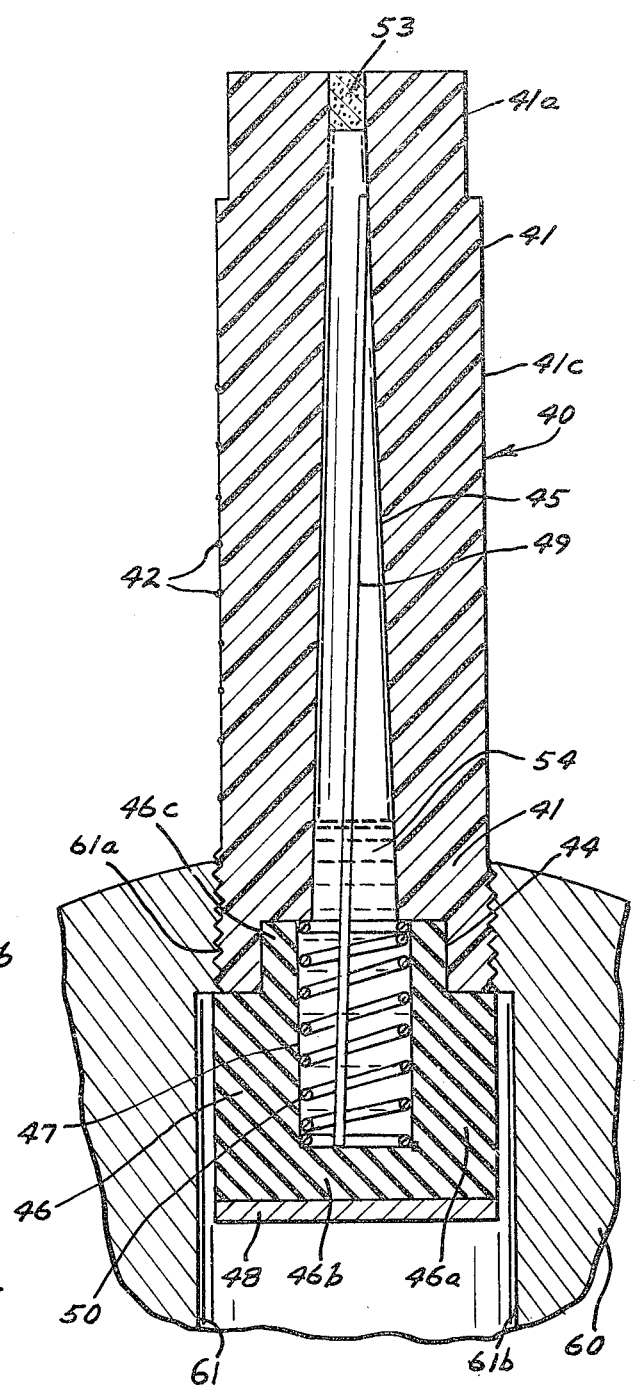
FIG. 2 is a longitudinal cross sectional view of a manometer of the first embodiment of this invention and an adjacent part of a mounting fitting.

Referring to FIG. 2 of the drawings, the liquid manometer or pressure indicator, generally designated 40, of the second embodiment of this invention includes an elongated, rigid, transparent housing 41. The housing has a polysided nut end portion 41a; an opposite, externally threaded end portion 41b; and an intermediate portion 41c that is provided with spaced indicia 42. In the threaded end portion 41b there is provided a bore having a bore portion 44 and part of an elongated tapered bore portion 45 that at its maximum diameter one end opens to bore portion 44. Bore portion 45 extends through the intermediate portion 41c and is open to the ambient atmosphere at the end opposite bore portion 44. Bore portion 45 at the juncture with bore 44 is of a substantially smaller diameter than bore portion 44, the intersection of said bore portions 44, 45 providing an annular shoulder.

A porous plug 53 is mounted in the end of 45 such as disclosed relative plug 23.

A resilient gland (pressure sensing element) 46, for example made of rubber, has a cylindrical tubular portion 46a, an end wall 46b joined to one annular edge of tubular portion 46a, and an axially extending annular liquid in said chamber, a gas permeable plug mounted by the housing second end portion in the bore second end portion to extend across the bore, spring means for resiliently urging the gland to a condition having a predetermined chamber capacity at a given pressure condition, said spring means comprising a coil spring having one end abutting against said shoulder and outer peripheral wall, and a rigid disk in the chamber in abutting relationship to said end wall, said coil spring having an opposite end abutting against said disk.

2. The apparatus of claim 1 further characterized in that said tubular portion is of a substantially longer axial length than the axial length of said first bore part.

3. A pressure indicator comprising an elongated, transparent housing having a first end portion, a second end portion and an axially elongated bore extending through the housing and having a first end portion and a second end portion, said bore first end portion opening through said housing first end portion, said bore first end portion having a first bore part and a second bore part opening to the first bore part axially remote from the bore second end portion, said second bore part being of a substantially smaller diameter than the bore first bore part to provide an annular shoulder, a pressure sensing resilient gland having a liquid chamber, said gland being hermetically secured to the housing first end portion to have said chamber in liquid communication with the first end portion of said bore, and having an end wall on the opposite side of the chamber from said bore, a tubular portion extending axially between said end wall and the housing and into abutting relationship with said shoulder, said tubular portion being generally frusto-conical and having a major base end abutting against said shoulder and a minor base end of a substantially smaller diameter than the diameter of the first bore part, an indicating liquid in said chamber, and spring means in abutting relationship to the gland for resiliently urging the gland to a condition having a predetermined chamber capacity at a given pressure condition.

* * * * *

UNITED STATES PATENT AND TRADEMARK OFFICE
CERTIFICATE OF CORRECTION

PATENT NO. : 3,901,083
DATED : August 26, 1975
INVENTOR(S) : Lindsay A. Wallace

It is certified that error appears in the above—identified patent and that said Letters Patent are hereby corrected as shown below:

Claim 1, line 2, "from" should have been printed as --having--.

Signed and Sealed this thirtieth Day of December 1975

[SEAL]

Attest:

RUTH C. MASON
Attesting Officer

C. MARSHALL DANN
Commissioner of Patents and Trademarks